(12) United States Patent
Yoshikawa et al.

(10) Patent No.: US 7,215,329 B2
(45) Date of Patent: May 8, 2007

(54) TOUCH PANEL INPUT DEVICE

(75) Inventors: Osamu Yoshikawa, Tokyo (JP); Hirotoshi Ishibashi, Tokyo (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 10/172,580

(22) Filed: Jun. 14, 2002

(65) Prior Publication Data

US 2003/0067449 A1  Apr. 10, 2003

(30) Foreign Application Priority Data

Oct. 10, 2001  (JP) .............................. 2001-312399

(51) Int. Cl.
*G09G 5/00* (2006.01)
*G06K 11/06* (2006.01)

(52) U.S. Cl. ................. 345/173; 178/18.01; 178/18.03

(58) Field of Classification Search ........ 345/173–178; 178/18.01–18.11, 20.01, 19.01–19.07; 39/25.35
See application file for complete search history.

(56) References Cited

U.S. PATENT DOCUMENTS

| | | | | |
|---|---|---|---|---|
| 4,786,896 A | * | 11/1988 | Harte | .......................... 345/173 |
| 5,504,980 A | * | 4/1996 | Yoshinaga et al. | ......... 29/25.35 |
| 6,118,435 A | * | 9/2000 | Fujita et al. | ................. 345/173 |
| 6,429,846 B2 | * | 8/2002 | Rosenberg et al. | ......... 345/156 |
| 6,492,979 B1 | * | 12/2002 | Kent et al. | ................... 345/173 |
| 6,504,530 B1 | * | 1/2003 | Wilson et al. | ............... 345/173 |
| 6,522,322 B1 | * | 2/2003 | Maeda et al. | ............... 345/173 |
| 6,608,618 B2 | * | 8/2003 | Shuler et al. | ............... 345/173 |
| 2003/0179190 A1 | * | 9/2003 | Franzen | ...................... 345/173 |

* cited by examiner

*Primary Examiner*—Bipin Shalwala
*Assistant Examiner*—David L. Lewis
(74) *Attorney, Agent, or Firm*—Darby & Darby (57) ABSTRACT

A piezoelectric substrate is fixed to the movable plate or the support substrate directly or through a drive electrode of the piezoelectric substrate. When a pressure on an input operation surface is detected, a drive voltage is impressed on the drive electrodes of the piezoelectric substrate. In response, the piezoelectric substrate vibrates the movable plate or the support substrate, thereby providing tactile feedback to an operator. Because the movable plate or the support substrate directly vibrates without an independent vibrating source, there is no energy loss or transmission delay caused by transmitting the vibration, and finely control of the contraction and expansion of the piezoelectric substrate allows fine control of the vibration. In one embodiment, the drive voltage is modulated with signals dependent on the location of the pressure. In another embodiment, the drive voltage is modulated with audio frequencies to create a speaker.

15 Claims, 5 Drawing Sheets

TOUCH PANEL INPUT DEVICE

BACKGROUND OF THE INVENTION

1. Field of the Invention

The present invention relates to a touch panel input device for vibrating a movable plate which is pressed, or a support substrate for supporting the movable plate, and generating an input operation feeling for an operator when the operator presses the movable plate. More specifically, the present invention relates to a touch panel input device for using a piezoelectric substrate to vibrate the movable plate or the support substrate.

2. Description of the Related Art

A touch panel input device includes a movable plate and a support substrate which are laminated with a slight gap between them to separate conductor layers on the opposing surfaces of the movable plate and the support substrate. The input device electrically detects a contact between the conductor layers at a pressed position when the movable plate is pressed, and provides information to a processing device such as a personal computer about the pressed position.

When the movable plate, the support substrate, the conductor layers, and the like are formed of a transparent material, and the touch panel input device is overlaid on a display screen such as a liquid crystal panel or a CRT, a user can press an input operation surface of the touch panel input device while seeing the display through the touch panel input device. The touch panel input device detects the pressed position and provides a processing device such as a personal computer with data on the location of the pressed part corresponding to the display.

Because the movable plate and the support substrate are laminated with a very small insulation gap between them in this type of a touch panel input device as described above, the stroke for pressing the movable plate is 0.1 to 0.5 mm, which is extremely small. An operator who presses the movable plate has difficulty knowing whether or not an input operation is completed.

A force feedback type touch panel is known to solve this problem. Such a force feedback type touch panel vibrates the movable plate or the support substrate to generate a tactile feedback to the finger of the operator when the input operation on the touch panel input device is successful.

Figure 8:
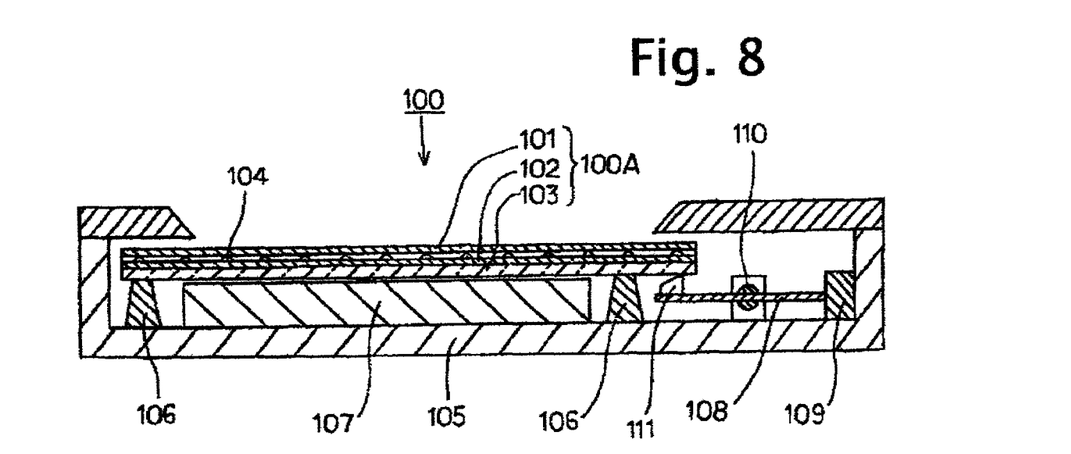
FIG. 8 is a longitudinal sectional view showing a conventional touch panel input device.

Referring to FIG. 8, a conventional touch panel input device 100 includes a movable plate 101 and a support substrate 103. The movable plate 101 is a flexible transparent plastic sheet. The support substrate 103 is made of glass, with a transparent plastic sheet 102 attached on a surface opposing to the movable plate 101. A large number of insulating protrusions 104 hold the movable plate 101 separated from the plastic sheet 102. Together, these elements constitute the touch panel 100A.

Conductor layers (not shown), made of a uniform resistive coating, cover opposing surfaces of the movable plate 101 and the plastic sheet 102. The conductor layers come in contact with each other, and conduct at a pressed position when a conductive sheet on the movable plate 101 is pressed into contact with the conductive sheet on the support substrate 103. The contact is position is detected based on voltages between leader electrodes (not shown) electrically connected to peripheral edges of the conductor layers. The voltages provide information about the x and y position of the position that is pressed.

The support substrate 103 is supported on a plurality of cylindrical cushion pillars 106 affixed to a bottom surface of a housing 105. The cushion pillars 106 are a rubber material on which the entire touch panel 100A is supported. A rubber with a hardness of 50 to 60 is used because the use of a rubber material that is too soft would absorb the pressure on the movable plate 103.

A display panel 107 is placed in a space formed by the cushion pillars 106 between the support substrate 103 and the housing 105. Parts formed on the support substrate 103 are made of a transparent material to permit display of the display panel 107 seen from above the movable plate 101.

A piezoelectric actuator 108, formed by laminating multiple piezoelectric substrates made of piezoelectric ceramic or the like, is disposed at one end of the rear side of the support substrate 103. The piezoelectric actuator 108 uses an electrostriction effect to vibrate itself. The piezoelectric actuator 108 serves as a vibration generating source when a drive voltage is applied thereto.

The piezoelectric actuator 108 has its base end fixed on a support stand 109 and its center rotatably supported by a support shaft 110. A contactor 111 is fixed to the outer end of the piezoelectric actuator 108 in contact with a rear surface of the support substrate 103.

When a position on the movable plate 101 is pressed for an input operation, the conductor layers come into contact with each other at the pressed position. A pressure detecting means (not shown) detects the pressure and the pressed position, and provides a processing device such as a personal computer with pressed position data.

When a pressure is detected, a drive voltage is impressed on drive electrodes of the piezoelectric actuator 108. This causes the piezoelectric actuator 108 to vibrate. The vibration is transmitted to the support substrate 103 through the contactor 111 at the end of the piezoelectric actuator 108. A fingertip pressing the movable plate 101 feels the vibration.

Thus, when an operator who presses the touch panel input device presses the movable plate 101, the operator feels the vibration at the fingertip to confirm that the input operation is conducted.

While the conventional touch panel input device uses a vibrator such as a piezoelectric actuator or a vibrating motor as a source for generating vibration to vibrate the movable plate 101 and/or the support substrate 103, because the vibration generating source is provided in a space independent to the movable plate 101 or the support substrate 103 constituting the touch panel, the thickness and the size of the housing 105 and thus the size of the entire input device increases. The design of the exterior of the device is also restricted.

Because the piezoelectric actuator 108 as the vibration generating source has to transmit sensitive vibrations to the touch panel 100A in contact with the piezoelectric actuator 108, the piezoelectric actuator 108 must generate a displacement with a certain amplitude, and is constituted while laminating multiple piezoelectric substrates. As a result, the thickness of the piezoelectric actuator 108 is increased. Because the manufacturing process for laminating multiple piezoelectric substrates comprises multiple processes including attaching a pair of drive electrodes to the individual layers, and then laminating the piezoelectric substrates to which the drive electrodes are attached in the thickness direction for integration, the cost of the part is relatively high.

When a vibrating motor is used as the vibration generating source, the size of the vibrating motor itself is large, and the parts cost is high.

Because the vibration of the touch panel 100A is an indirect vibration transmitted from the vibration generating source, it is difficult to transmit a delicate feeling of the vibration from the vibration generating source to the touch panel 100A. For example, if the frequency of the vibration is changed to transmit different information to an operator, because the touch panel 100A does not precisely move accordingly, it is impossible for the operator to discern the different information.

Because a delay exists between the generation of the vibration of the vibration generating source and the vibration of the touch panel 100A, it is difficult to directly transmit a slight change of the vibration.

Because it is necessary to vibrate the vibration generating source such as the piezoelectric actuator 108 and a vibrating motor continuously for a certain time period, a drive circuit for driving the vibration generating source is a complicated circuit which uses an oscillation circuit. That is, because the vibration source such as a vibrating motor does not respond to a drive voltage in a momentary pulse waveform, the drive circuit must operate for a certain time period including a start operation control. When a drive voltage in the form of a momentary pulse waveform is applied to the piezoelectric actuator 108, although the piezoelectric actuator 108 momentarily contracts and expands accordingly, because of damping of the expansion and contraction (a vibration) transmitted to the touch panel 100A, as described before, an operator cannot sense the momentary vibration. There is also a problem of generating an input operation feeling as well.

In addition, a complicated structure such as the support stand 109 and the support shaft 110 for rotatably supporting the center of the vibration generating source 108 as described above is necessary to secure the vibration generating source 108 in the housing 105. The vibration generating source 108 merely vibrates to generate noise which is not transmitted to the touch panel 100A unless the vibration generating source 108 is secured in a mounting.

Manufacturing precision is required for the vibration generating source 108, and the vibration transmission mechanism of the touch panel 100A such as the support substrate 104. If a gap is present between the contactor 111 and the support substrate 104, for example, noise is generated during vibrating, but the vibration is attenuated during transmission.

OBJECTS AND SUMMARY OF THE INVENTION

In view of these conventional problems, it is an object of the present invention to provide a touch panel input device in which the size of the entire device is not increased and the exterior design is not restricted while a structure of vibrating a movable plate or a support substrate is adopted.

Another object of the present invention is to provide a touch panel input device for freely and finely controlling the vibration of the movable plate or the support substrate.

Still, another object of the present invention is to provide a touch panel input device using a simple drive circuit to generate a vibration sensitive to an operator on the movable plate or the support substrate.

A touch panel input device according to a first aspect of the present invention comprises a movable plate including an input operation surface on its surface, a support substrate placed with a slight insulating gap to the movable plate for supporting a back surface of the movable plate, pressure detecting means for detecting a pressure and a pressed position on the input operation surface based on a contact between conductor layers formed respectively on opposing surfaces of the movable plate and the support substrate, and providing pressed position data, and a piezoelectric substrate including a pair of drive electrodes fixed on both opposing surfaces, and fixed directly or through the drive electrode to the movable plate or the support substrate, wherein a drive voltage is impressed on the pair of drive electrodes, and the contracting and expanding piezoelectric substrate vibrates the movable plate or the support substrate to generate an input operation feeling when a pressure is detected on the input operation surface.

When a drive voltage is impressed between the pair of drive electrodes, the piezoelectric substrate contracts and expands because of electrostriction effect. Because the piezoelectric substrate is directly fixed to the movable plate or the support substrate thorough one of the drive electrodes, the contraction and expansion of the piezoelectric substrate generates a stress which vibrates with a large amplitude on the movable plate or the support substrate itself to which the piezoelectric substrate is fixed.

Because the movable plate or the support substrate itself vibrates, changing the waveform of the drive voltage which drives the piezoelectric substrate provides the movable plate or the support substrate with a delicate vibration action.

A touch panel input device according to a second aspect of the invention is the touch panel input device according to the first aspect, further comprising a spacer member placed at peripheral frames between inner surfaces of the movable plate and the support substrate for laminating and placing the movable plate and the support substrate with a slight gap to each other, and is characterized in that the piezoelectric substrate is fixed directly or through the drive electrode on either one of the inner surfaces of the movable plate and the support substrate facing each other at the frames, and is installed in a space where the spacer is placed.

Because a single layer substrate made of a piezoelectric material can constitute the piezoelectric substrate, the thickness of the piezoelectric substrate can be made thin, and can be interposed in a slight gap between the movable plate and the support substrate.

Because a space for placing the spacer member which laminates and places the movable plate and the support substrate slightly separated to each other is used to place the piezoelectric substrate and the pair of drive electrodes on both sides thereof, it is not necessary to provide an independent space for storing the structure which generates the vibration.

A touch panel input device according to a third aspect of the invention is the touch panel input device according to the second aspect, characterized in that the pressure detecting means impresses a detecting voltage on, or detects a voltage of any leader electrode electrically connected with a peripheral edge of the individual conductor layer of the movable plate or the support substrate to detect the pressure and the pressed position on the input operation surface, the leader electrode fixed on the inner surface of the frame of the movable plate or the support substrate serves as one of the drive electrodes of the piezoelectric substrate, and the piezoelectric substrate is fixed through the leader electrode.

Because the leader electrode electrically connected with the peripheral edge of the conductor layer is shared by one of the drive electrodes for the piezoelectric substrate, it is not necessary to form one drive electrode independently.

Because the leader electrode is an electrode for electrically connecting the conductor layer with the outside, it is possible to use the leader electrode and wiring connected with the outside for impressing the drive voltage on the one of the drive electrodes.

A touch panel input device according to a fourth aspect of the invention is the touch panel input device according to the first aspect, characterized in that the piezoelectric substrate is fixed directly or through the drive electrode on a rear surface of the support substrate.

Because the piezoelectric substrate is simply fixed through the one of the drive electrodes on the rear side of the support substrate of the touch panel input device, the vibration feature is added without changing the conventional structure.

A touch panel input device according to a fifth aspect of the invention is the touch panel input device according to the fourth aspect, characterized in that the movable plate and the support substrate are made of a transparent material for transmitting emitted light from a light-emitting element for illumination provided on a rear side of the support substrate, and the piezoelectric substrate is fixed directly or through the drive electrode to a part of a rear surface of the support substrate where the leader electrodes electrically connected with the peripheral edge of the conductor layer are formed.

Because the piezoelectric substrate is fixed on the rear side of the support substrate between wiring for the light-emitting element and the leader electrodes, the leader electrodes are shielded by the drive electrodes fixed on both surfaces of the piezoelectric substrate opposing to each other, and a high frequency noise generated on the wiring for the light-emitting element is prevented from transmission to the leader electrodes as a result of static capacitive coupling.

A touch panel input device according to a sixth aspect of the invention is the touch panel input device according to any one of the first to fifth aspects, characterized in that an output voltage present on both ends of a coil when a low voltage trigger pulse is supplied is impressed as a drive voltage on the pair of drive electrodes of the piezoelectric substrate when a pressure is detected on the input operation surface.

Because the movable plate or the support substrate itself vibrates with a large amplitude, simply impressing the drive voltage in a momentary pulse waveform present on both ends of the coil when a trigger pulse is entered on the piezoelectric substrate generates a vibration sensitive to an operator on the movable plate or the support substrate.

A touch panel input device according to a seventh aspect of the invention is the touch panel input device according to any one of the first to fifth aspects, characterized in that, when a pressure is detected on the input operation surface, a drive voltage with an audio band frequency is impressed on the pair of drive electrodes to contract and expand the piezoelectric substrate for vibrating the movable plate or the support substrate at the audio band frequency, and a sound representing an input operation is generated.

Because the movable plate or the support substrate vibrates at the audio band frequency, and generates an operation sound for representing a pressure detection, it is possible to use the operation sound to generate an input operation feeling without providing an independent speaker.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
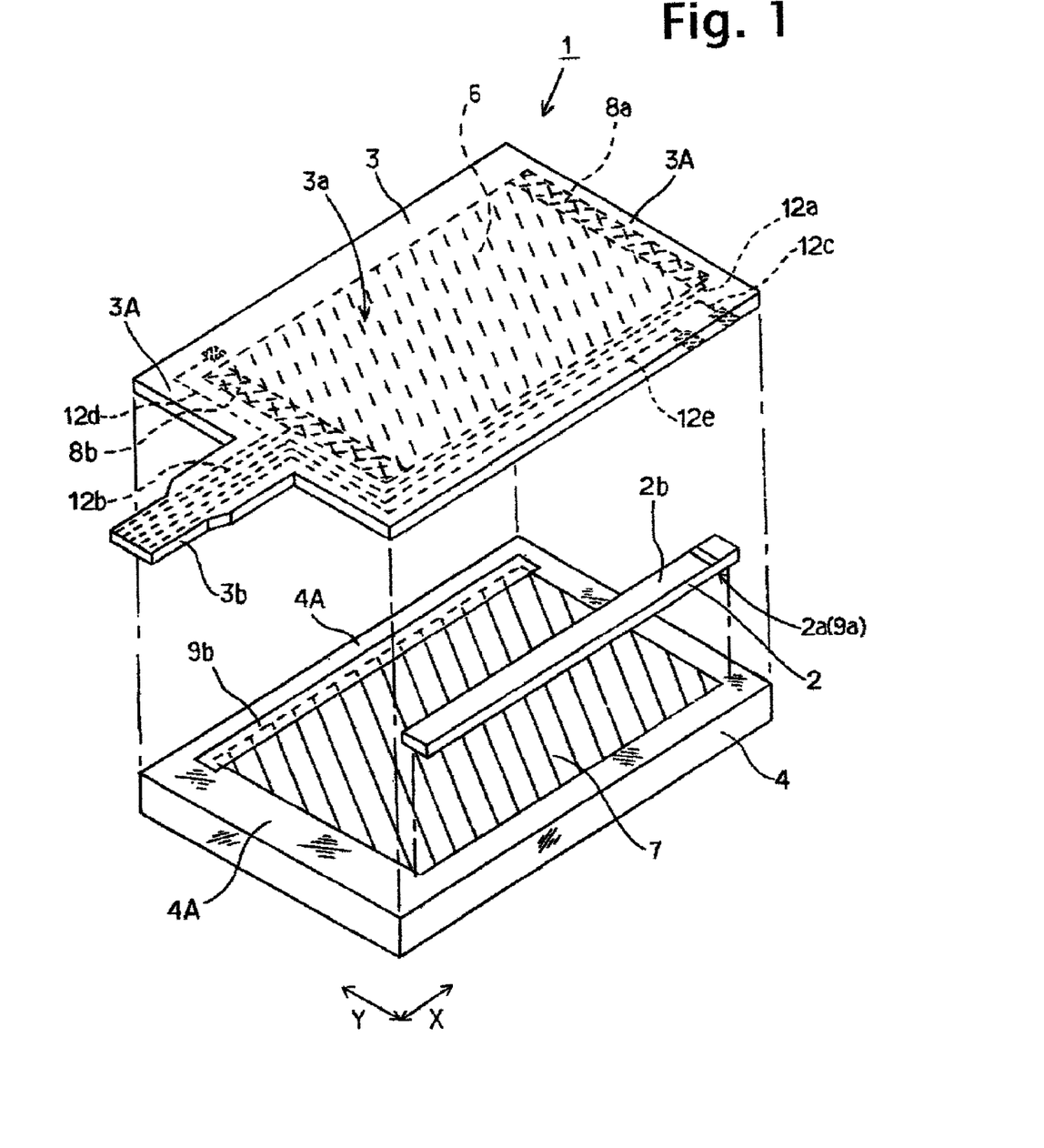
FIG. 1 is an exploded perspective view of a touch panel input device according to an embodiment of the present invention.
Figure 2:
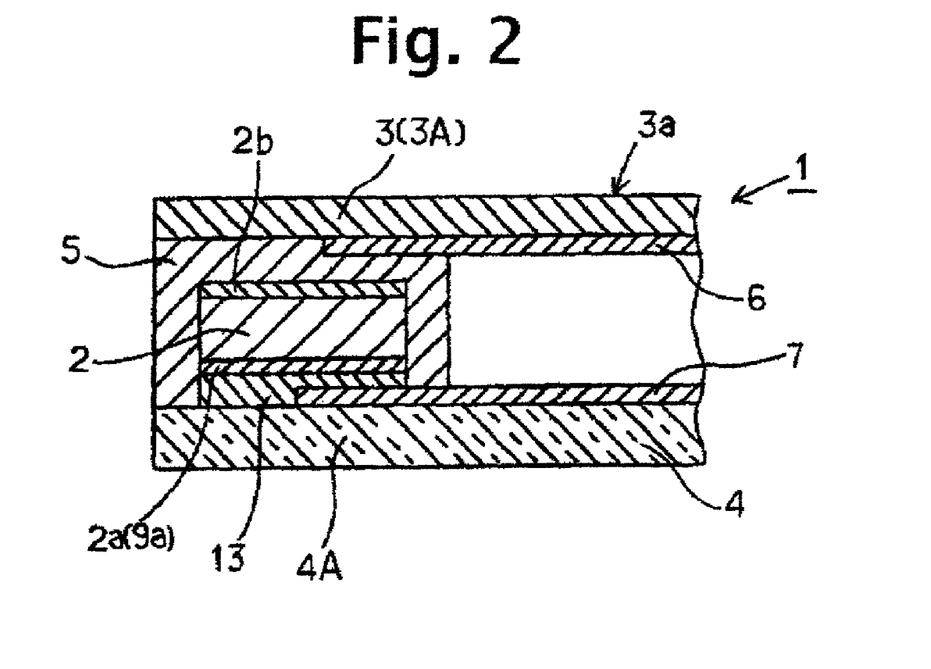
FIG. 2 is a longitudinal sectional view of a principal part of the touch panel input device of FIG. 1.

Referring first to FIGS. 1 and 2, a touch panel input device 1 according to the present embodiment adopts a so-called resistance-sensitive tablet system where uniform resistor films form conductive layers on facing surfaces. Voltages generated upon touching the external surface are processed to detects a contact position (a pressed position) between the conductive layers.

A movable plate 3 is a flexible rectangular sheet of a suitable transparent plastic material such as, for example, PET (polyethylene terephthalate). Although an arbitrary material which slightly bends toward a support substrate 4 described below is used as a material for the movable plate 3, when a transparent material is used for showing a display part (not shown) provided inside the support substrate 4 as the present embodiment, the material therefor could include a glass substrate, an acrylic board for providing a certain degree of stiffness, and a polycarbonate (PC), a polyethersulfone (PES), and a polyimide (PI) for providing flexibility.

A transparent hard coat agent (not shown) is applied on the surface of the movable plate 3 to protect its top surface which is contacted by an operator as it serves as an input operation surface 3a.

The support substrate 4 is a transparent substrate formed as a rectangular thin plate with the same contour as that of the movable plate 3 using soda lime glass. Although the support substrate 4 is a substrate for supporting the rear side of the movable plate 3 to be pressed, and requires a certain degree of stiffness, it is not always necessary to form the support substrate 4 of a transparent material when the display part is not included inside the support substrate 4. The support substrate 4 is not limited to a glass plate, but may be a plastic plate such as an acrylic substrate or a metal plate such as an aluminum or steel.

The movable plate 3 and the support substrate 4 are laminated with a slight gap therebetween. An adhesive layer 5 is interposed between individual frames 3A and 4A on peripheries of the movable plate 3 and the support substrate 4 to maintain the required gap. A movable conductor layer 6 and a fixed conductor layer 7, which are made of a transparent conductor film, are fixed with an even film thickness facing each other on opposing surfaces of the movable plate 3 and the support substrate 4, respectively. The movable conductor layer 6 and the fixed conductor layer 7 are formed with ITO (indium tin oxide) with even film thicknesses. As a consequence of this uniformity, the resistance per length is equal at individual positions on the conductor layers.

Dot spacers (not shown) made of insulating synthetic resin are fixed at a predetermined spacing on the fixed conductor layer 7. These dot spacers prevent the movable conductor layer 6 and the fixed conductor layer 7 from accidentally being brought into contact with each other when the hand of an operator unintentionally touches a part of the input operation surface 3a. The dot spacers have a height that is less than the gap between the movable conductor layer 6 and the fixed conductor layer 7 separated by the adhesive layer 5.

An X impressing side leader electrode 8a, and an X ground side leader electrode 8b connected with the movable conductor layer 6 are printed in the Y direction on opposed edges of the movable conductor layer 6 on the rear surface of the movable plate 3. The X impressing side leader electrode 8a, and the X ground side leader electrode 8b are transparent conductor thin plates in a stripe shape made of silver. Leads 12a and 12b on the rear surface of the movable plate 3 for the X impressing side leader electrode 8a and the X ground side leader electrode 8b are led out to an external connector 3b of the movable plate 3.

In the same way, a Y ground side leader electrode 9b electrically connected with the fixed conductor layer 7 is printed on one edge of the fixed conductor layer 7 in a Y direction orthogonal to the X direction in FIG. 1 on the surface of the support substrate 4 facing the movable plate 3. The Y ground side leader electrode 9b is a transparent conductor thin plate in a stripe shape made of silver. The Y ground side leader electrode 9b is led out to the external connector 3b of the movable plate 3 by a lead 12d on the rear surface of the movable plate 3. The lead 12d is electrically connected to the surface of the Y ground side leader electrode 9b using a conductive adhesive.

A Y impressing side leader electrode 9a electrically connected with the fixed conductor layer 7 is formed on the other edge opposite the edge of the fixed conductor layer 7 on which the Y ground side leader electrode 9b is printed in the X direction. Because the Y impressing side leader electrode 9a serves as one drive electrode 2a on the piezoelectric substrate 2, the drive electrode 2a is fixed using conductive adhesive along the other edge of the fixed conductor layer 7. The Y impressing side leader electrode 9a electrically connected with the fixed conductor layer 7 is formed when the piezoelectric substrate 2 is fixed to the support substrate 4.

Figure 3A:
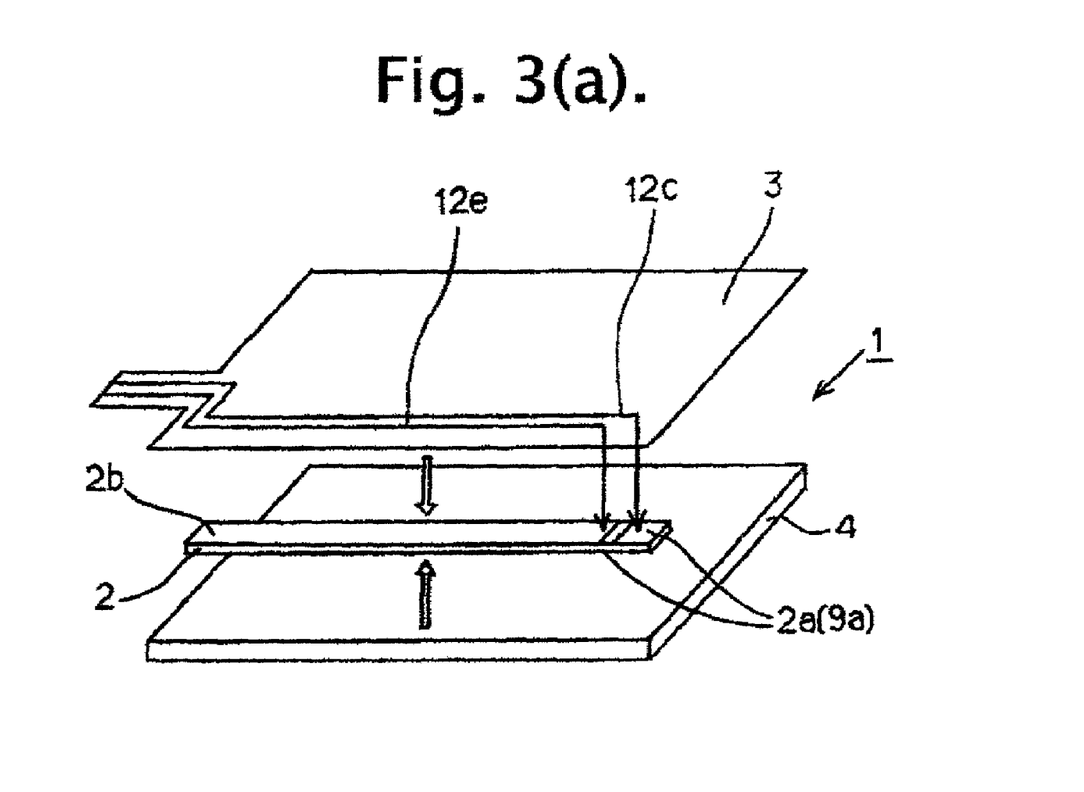
FIG. 3(a) is a descriptive drawing showing an installation of a piezoelectric substrate.
Figure 3B:
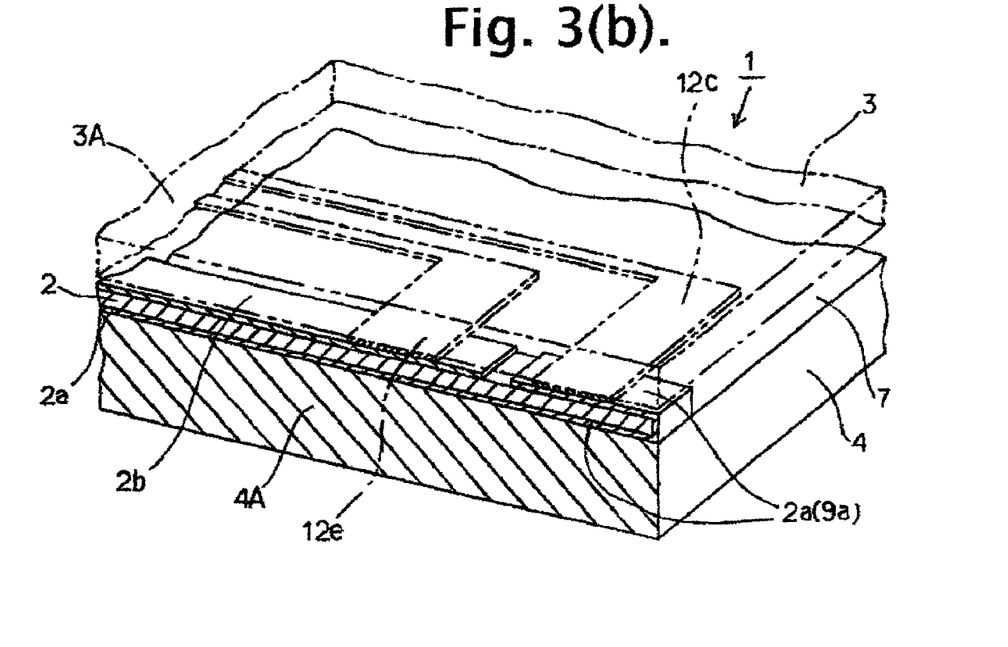
FIG. 3(b) is a perspective view of a principal part showing a connection between a pair of drive electrodes and leads.

Referring now also to FIG. 3, the Y impressing side leader electrode 9a (the one drive electrode 2a) is bent back toward the front side on one end in the lengthwise direction of the piezoelectric substrate 2. The Y impressing side leader electrode 9a is electrically connected to a lead 12c on the rear surface of the opposing movable plate 3 using conductive adhesive, and is led out to the external connector 3b.

The other drive electrode 2b of the piezoelectric substrate 2 is electrically connected to a lead 12e on the rear surface of the opposing movable plate 3 using conductive adhesive. The lead 12e is led out to the external connector 3b in the same way as the other leads.

The individual leader electrodes 8a, 8b, 9a, and 9b, and the drive electrode 2b which are led out to the external connector 3b through the leads 12a, 12b, 12c, 12d, and 12e, are electrically connected to external circuits including a pressure detecting circuit, and the drive circuits 10 and 11 described below through a conventional connector (not shown) connected to the external connector 3b.

The wiring is simplified because simply adding the lead 12e to the movable plate 3 allows supplying the drive voltage for driving the piezoelectric substrate 2 from the outside.

Also, because the Y impressing side leader electrode 9a also serves as one drive electrode 2a for the piezoelectric substrate 2, the lead 12c is shared for connecting to the external circuits. The Y impressing side leader electrode 9a serves for impressing a detection voltage for detecting a pressed position, or for detecting an electric potential of the fixed conductor layer 7. The drive electrode 2a serves for impressing the drive voltage on the movable plate 2 when a pressure is detected as described later. Because detecting the pressed position, and impressing the drive voltage when a pressure is detected are different from each other in timing, and are not conducted simultaneously, the single electrode can be shared by both of them.

The piezoelectric substrate 2 is a single-layer substrate formed of a piezoelectric material such as piezoelectric single crystal, piezoelectric ceramic typified by PZT (lead zirconium titanate) ceramic, and polyvinylidene fluoride (PVDF), and a piezoelectric ceramic plate made of a PZT piezoelectric ceramic material which has mechanical durability, and is most widely used is used in this case. The piezoelectric substrate 2 is formed into a thin plate in a stripe shape along a side edge of the fixed conductor layer 7. Because the piezoelectric substrate 2 is a thin plate, when it vibrates, it produces a large distortion. In addition, the piezoelectric substrate 2 operates at low voltage.

The pair of drive electrodes 2a and 2b which impress the drive voltage on the piezoelectric substrate 2 are attached on both the front and the rear surfaces opposing to each other of the piezoelectric substrate 2 using vapor disposition or screen printing, and then are fixed using calcination. The drive electrode 2a which covers the rear surface of the piezoelectric substrate 2 is bent back on one end in the lengthwise direction of the piezoelectric substrate 2, and is exposed on the front surface with a gap to the other drive electrode 2b for avoiding contact with it.

The piezoelectric substrate 2, with the drive electrodes 2a and 2b fixed on both sides, is placed between the movable plate 3 and the support substrate 4 while using a part of a space for filling the adhesive layer 5 which is filled in between opposing surfaces of the individual frames 3A and 4A for laminating the movable plate 3 and the support substrate 4 with a slight gap as shown in FIG. 2. While the height of the space for filling, namely the gap between the movable plate 3 and the support substrate 4, is generally 100 μm to 1 mm, it is possible that the height of the piezoelectric substrate 2 including the drive electrodes 2a and 2b fixed to the both sides of the piezoelectric substrate 2 is about 200 μm because the piezoelectric substrate 2 has a single-layer thin plate structure. It is possible to find sufficient space to install the piezoelectric substrate 2 in the space for filling.

The piezoelectric substrate 2 is fixed on the surface of the support substrate 4 such that one drive electrode 2a (the Y impressing side leader electrode 9a) fixed on the rear surface is placed across the other side edge of the fixed conductor layer 7 and the surface of the support substrate 4, and is fixed to the fixed conductor layer 7 and the support substrate 4 using conductive adhesive 13 as shown in the drawing.

Because the drive electrode 2a of the piezoelectric substrate 2 serves as the leader electrode in the present embodiment, the conductive adhesive is used to fix the piezoelectric substrate 2 to the support substrate 4. When drive electrode 2a is directly fixed to the support substrate 4, the adhesive is not necessarily conductive. Therefore, different types of adhesives such as epoxy adhesive and acrylic adhesive may be applicable.

Electrostriction effect of the piezoelectric substrate 2 is used to generate a vibration on the support substrate 4 in the present invention. Because the piezoelectric substrate 2 is directly fixed to the support substrate 4, the contraction and expansion of the piezoelectric substrate 2 generates a vibration with a large amplitude on the support substrate 4. For example, when an electric field of $10*10^5$ V/m is applied to a PZT piezoelectric material having a dielectric constant of 3400, a piezoelectric constant of $590*10^{12}$ C/N, and an elastic compliance of $20*10^{-12}$ m$^2$/N, a distortion of $5.9*10^4$ is generated. A large stress of $3*10^7$ N/m is generated when this distortion is clamped.

When this electrostriction effect is used, simply impressing a drive voltage of about ±20 V between the pair of drive electrode 2a and 2b in a thickness direction indicated by an arrow in FIG. 3(a) generates a vibration with an amplitude large enough for sensing with the finger even through the movable plate 3 on the support substrate 4. Adjusting a driving voltage and/or a length of a part where the piezoelectric substrate 2 is fixed to the support substrate 4 allows adjusting the amplitude of the vibration.

Because the piezoelectric substrate 2 is fixed on the peripheral edge of the fixed conductor layer 7, the input operation face 3a does not become narrower. The pair of piezoelectric substrates 2 may be installed on the both peripheral edges of the fixed conductor layer 7 opposed to each other.

The piezoelectric substrate 2 is fixed on the support substrate 4 through the drive electrode 2a. Then the adhesive layer 5 is applied between the opposing surfaces of the individual frames 3A and 4A to adhere the movable plate 3 and the support substrate 4 to each other as shown in FIG. 2. When the individual frames 3A and 4A of the movable plate 3 and the support substrate 4 are pressed with the adhesive layer 5 are placed between them, the opposing surfaces of the frames 3A and 4A come into close contact with each other through the adhesive layer 5. The movable conductor layer 6 and the fixed conductor layer 7 are positioned in parallel with each other with a slight gap between them. Because the adhesive layer 5 covers the other drive electrode 2b of the piezoelectric substrate 2, the piezoelectric substrate 2 contracts and expands without constraint.

A pressure detecting circuit (not shown) detects a pressure and a pressed position on the input operation surface 3a of the movable plate 3 thorough the connector connected with the external connector 3b, and provides pressed position data on them. The following section describes this action.

A predetermined voltage for detecting pressure is applied to the X impressing side leader electrode 8a or the X ground side leader electrode 8b. This maintains the movable conductor layer 6 at this electric potential. The fixed conductor layer 7 is grounded through a resistor to monitor the electric potential in a wait state in the absence of pressure detection. The electric potential of the fixed conductor layer 7 is at ground electric potential when the movable plate 3 is not pressed. When the conductor layers 6 and 7 come in contact with each other as a result of pressing, the movable conductor layer 6 supplies the resistor with a current and the electric potential of the fixed conductor layer 7 increases to a certain potential level. Thus, pressing the movable plate 3 can be detected when a predetermined voltage threshold is set, and the electric potential of the fixed conductor layer 7 exceeds the predetermined threshold.

When a pressure is detected, the pressure detecting circuit operates to detect the pressed position. When the pressure is detected, the first drive circuit 10, which impresses the drive voltage on the piezoelectric substrate 2 also starts. This operation is described later.

The pressed position is detected in the X direction and in the Y direction respectively. When the pressed position in the X direction is detected, a voltage for detecting a coordinate is impressed on the X impressing side leader electrode 8a. Simultaneously, the X ground side leader electrode 8b is grounded to form a constant electric potential gradient across the movable conductor layer 6. The electric potential at the pressed position is read out as the electric potential of the fixed conductor layer 7 when the fixed conductor layer 7, which comes in contact with the movable conductor layer 6, is set as a high impedance. A voltage detection circuit such as an A/D converter connected with either one of the Y impressing side leader electrode 9a and the Y ground side leader electrode 9b reads the electric potential at the contact position. Because the constant electric potential gradient is formed across the movable conductor layer 6, the electric potential at the contact position is a value proportional to a distance in the X direction from the X ground side leader electrode 8b to the X impressing side leader electrode 8a, and is used for detecting the X coordinate of the pressed position.

When the pressed position in the Y direction is detected, a constant electric potential gradient in the Y direction is formed across the fixed conductor layer 7. A voltage detection circuit connected to the X impressing side leader electrode 8a or the X ground side leader electrode 8b reads the electric potential at the contact position in the same way as described above. The electric potential at the contact position is a value proportional to a distance in the Y direction from the Y ground side leader electrode 9b to the Y impressing side leader electrode 9a. This electric potential is used for detecting the Y coordinate of the pressed position.

These X and Y coordinate detecting modes are repeated, and the pressed position as a result of pressing the input operation surface 3a is detected in the X and Y directions. The pressed position data, comprising the X coordinate and the Y coordinate, are provided to a processing device such as a personal computer (not shown in the drawings).

As long as the touch panel input device 1 detects pressure on the movable plate 3, the pressure detecting circuit repeats the detection of the pressure and the pressed position. When pressure is first detected after a period of time when pressure is not present, the first drive circuit 10 starts to impress the drive voltage on the piezoelectric substrate 2 to vibrate the support substrate 4.

Figure 4:
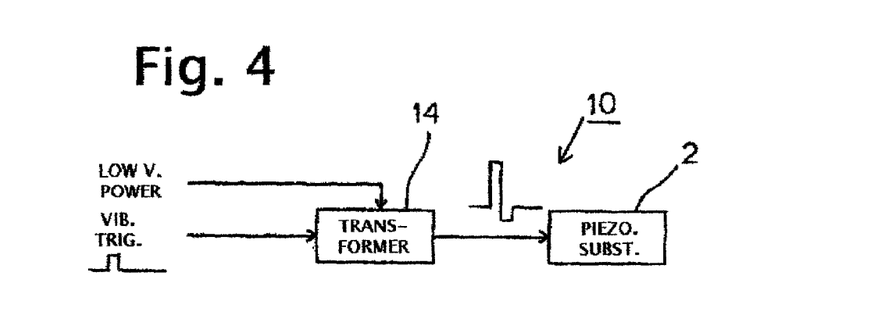
FIG. 4 is a block diagram of a first drive circuit for driving the piezoelectric substrate of FIG. 1.
Figure 5A:
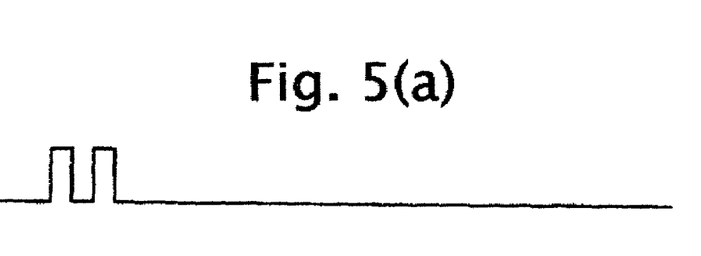
FIG. 5(a) shows a drive voltage waveform for generating a click feeling in the embodiment of FIG. 1.
Figure 5B:
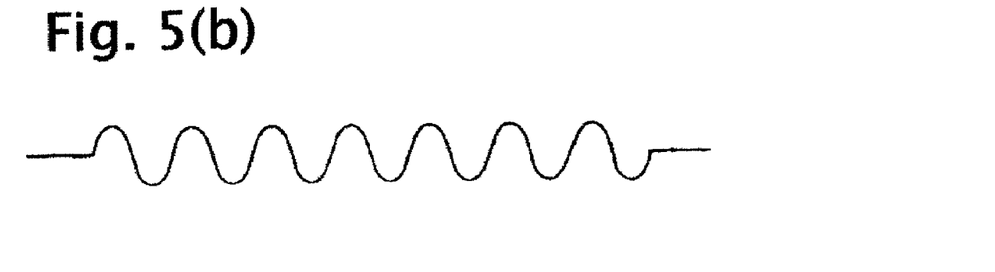
FIG. 5(b) shows a drive voltage waveform for generating moderate vibration feeling in the embodiment of FIG. 1.
Figure 5C:
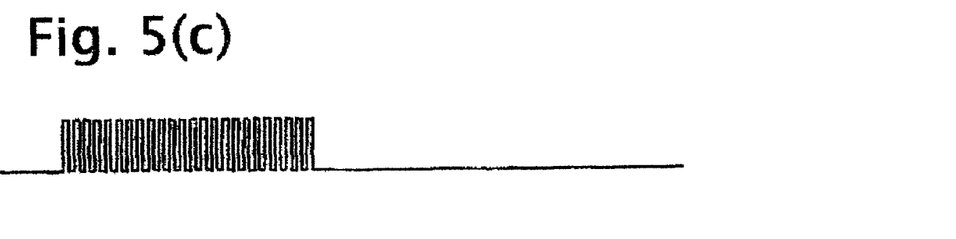
FIG. 5(c) shows a drive voltage waveform for generating an audible sound in the embodiment of FIG. 1.
Figure 5D:
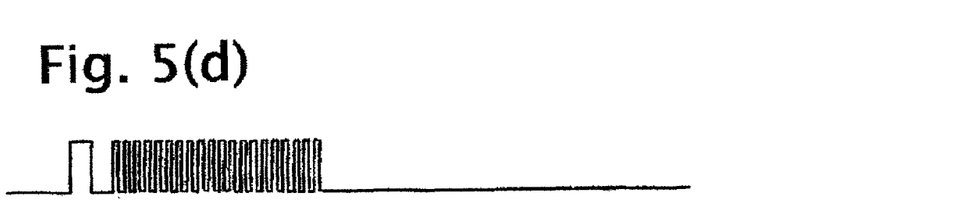
FIG. 5(d) shows a drive voltage waveform for generating an audible sound after a click feeling in the embodiment of FIG. 1.

The first drive circuit 10 is a simple circuit as shown in FIG. 4. The pair of drive electrodes 2a and 2b of the piezoelectric substrate 2 are connected with the output of the transformer circuit 14. When a pressure is detected, a vibration trigger signal with a period of 5 to 10 msec is provided for the transformer circuit 14, a DC low voltage power supply momentarily impresses a few volts on the transformer circuit 14. Thus, an induction voltage from the coils is generated in the transformer circuit 14. A drive voltage of about ±40 V is impressed on the piezoelectric substrate 2.

When the drive voltage is impressed on the piezoelectric substrate 2, the piezoelectric substrate 2 cyclically contracts and expands to vibrate the support substrate 4 to which the piezoelectric substrate 2 is fixed. The waveform of the drive voltage for driving the piezoelectric substrate 2 is a pulse waveform generated momentarily. The support substrate 4 vibrates while the drive voltage is impressed. Because a vibration with a large amplitude is generated, even in a momentary period, an operator feels the vibration transmitted to the fingertip through the movable plate 3 which is in contact with the support substrate 4, with sufficient strength to recognize that the pressing operation is detected.

Thus, the first drive circuit 10 for generating the vibration can be an extremely simple circuit without requiring an oscillation circuit, or an oscillation circuit for amplification, for maintaining the vibration for a certain period.

Because the vibration of the support substrate 4 is directly associated with the contraction and the expansion of the piezoelectric substrate 2, the drive voltage waveform for driving the piezoelectric substrate 2 can be changed as shown in individual drawings in FIGS. 5(*a*)–5(*d*) to provide a slight vibration change for an operator.

FIG. 5(*a*) shows a drive voltage waveform for providing a click feeling similar to one generated for an operator when the operator presses a push button supported by a disc spring. A pulse with a period of 5 to 10 msec is generated twice after a pressure is detected. As a result, the support substrate 4 momentarily vibrates twice.

FIG. 5(*b*) shows a drive voltage waveform of sinusoidal AC with a frequency of 20 to 30 Hz. This impresses a sinusoidal wave vibration with the same frequency on the support substrate 4. As a result, an operator feels a vibration similar to that experienced if a vibrating motor were vibrating the support substrate 4.

FIG. 5(*c*)) is a drive voltage waveform of AC with a period of several hundreds of microseconds. The support substrate 4 vibrates with the same period. Because the vibrating frequency of the support substrate 4 is several kilo hertz, although the vibration frequency is too high for an operator to detect the vibration in a finger, the vibration has the audio frequency. The vibration generates an operation sound if the support substrate 4 is a glass substrate or the like. This permits generating a sound to transmit the input operation feeling to an operator, without the necessity to provide an independent speaker for generating the operation sound.

FIG. 5(*d*) shows a combination of the drive voltage waveforms from 5(*a*) and 5(*c*). The operator first feels a click at the fingertip, and then hears the operation sound to confirm the pressing operation.

A portable digital assistant (PDA), or a portable data terminal such as a cellular phone is provided with a display plate for showing entered characters, and the content of an incoming call in addition to a vibrating motor for notifying the incoming call, and a speaker for providing a sound for the incoming call. Since it is desirable to reduce the size and the weight of the device as much as possible, it is impossible to install an additional vibrating part such as a conventional piezoelectric actuator or a vibrating motor for vibrating the display plate. No previous product has been capable of vibrating the display plate. With the present invention, simply attaching the piezoelectric substrate 2 to the display plate, and changing the drive voltage waveform as described, above satisfies all these features.

Figure 6:
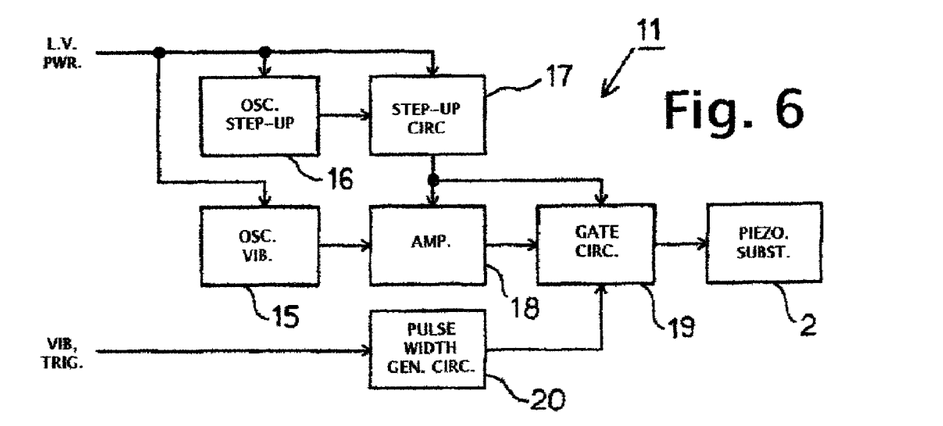
FIG. 6 is a block diagram of a second drive circuit for driving the piezoelectric substrate of FIG. 1.

Referring now to FIG. 6, a second drive circuit 11 is used to generate the waveforms of FIGS. 5(*a*)–5(*d*). An oscillation circuit for vibration 15 shown in FIG. 6 is substituted for the first drive circuit 10, for generating the individual drive voltage waveforms shown in FIGS. 5(*b*) to 5(*d*) to continuously drive the piezoelectric substrate 2 for a certain period.

An oscillating circuit for step-up 16 oscillates at 20 to 30 kHz when a DC low voltage power supply of several volts is used in the second drive circuit 11. A step-up circuit 17 connected with the oscillating circuit for step-up 16 controls switching of a current flowing through a transformer with the period determined by the oscillating circuit for step-up 16, steps up several volts from the DC low voltage power supply to a DC voltage of several dozens of volts, and provides an amplifier circuit 18 with the voltage.

The oscillating circuit for vibration 15 generates a drive signal with a frequency for vibrating the support substrate 4, and provides the amplifier circuit 18 with the drive signal. The amplifier circuit 18 uses the DC voltage provided from the step-up circuit 17 to amplify the drive signal, and the amplified signal to a gate circuit 19.

A pulse width generating circuit 20 is also connected to an input of the gate circuit 19. The pulse width generating circuit 20 generates a pulse with a width for vibrating the support substrate 4 when a pressure is detected. The pulse width generating circuit 20 receives a vibration trigger generated by the pressure detecting circuit. The gate circuit 19 impresses the drive signal from the amplifier circuit 18 as the drive voltage on the drive electrodes 2*a* and 2*b* of the piezoelectric substrate 2 while the gate circuit 18 receives the pulse.

The second drive circuit 11 allows freely setting the frequency of the drive signal generated from the oscillation circuit for vibration 15, and the pulse width generated from the pulse width generating circuit 20 for generating an arbitrary drive voltage waveform such as the drive voltage waveforms exemplified in the individual drawings in FIGS. 5(*a*)–5(*d*).

While the piezoelectric substrate 2 is provided between the movable plate 3 and the support substrate 4 in the first embodiment, the piezoelectric substrate 2 may be fixed to any part on the movable plate 3 or to the support substrate 4 to embody the present invention.

Figure 7:
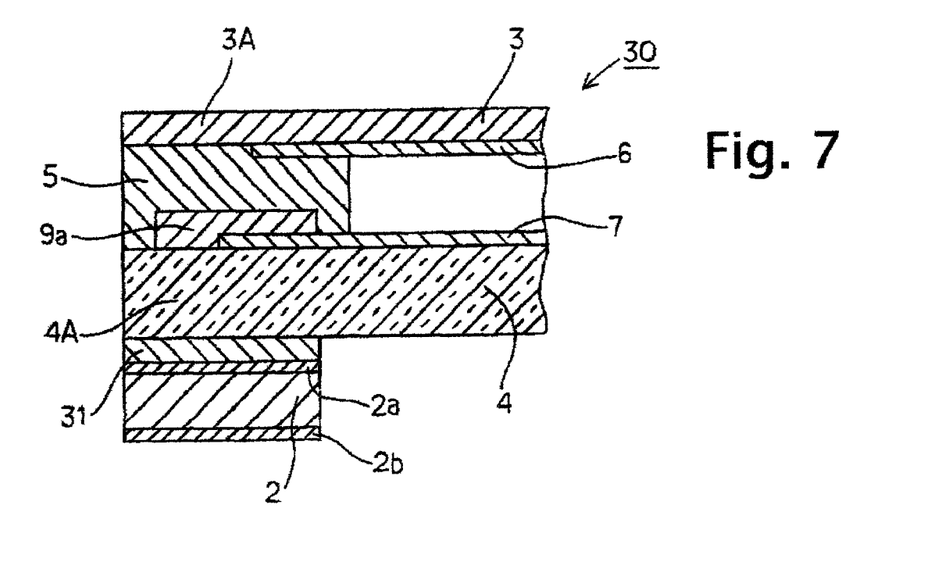
FIG. 7 is a sectional view of a principal part of a touch panel input device according to a second embodiment of the present invention.

Referring now to FIG. 7, a touch panel input device 30 according to a second embodiment of the present invention employs a piezoelectric substrate 2 fixed to the rear surface of the support substrate 4. Because the second embodiment is the same as the first embodiment, except for the installation position of the piezoelectric substrate 2, the same numerals are assigned to the identical parts, and detailed description is omitted.

The piezoelectric substrate 2 is fixed to a part of a rear surface of the support substrate 4. A Y impressing side leader electrode 9*a* is formed through one drive electrode 2*a* using an adhesive layer 31. Because the leads 12*c* and 12*e* on the rear surface of the movable plate 3 are not used for electrically connecting the pair of drive electrodes 2*a* and 2*b* to external circuits including the drive circuit 10 or 11 as in the first embodiment, leads provided independently (not shown) are used for electrical connection.

Because the Y impressing side leader electrode 9*a*, which is electrically connected with the fixed conductor layer 7, cannot serve as the drive electrode 2*a*, the Y impressing side leader electrode 9*a* is printed and formed at the position where the drive electrode 2*a* is fixed in the first embodiment 1 as shown in the drawing.

The drive circuits 10 and 11 impress the drive voltage on the pair of drive electrodes 2*a* and 2*b* when a pressure is detected as in the first embodiment. The contraction and expansion of the piezoelectric substrate 2 vibrates the support substrate 4. An operator feels the vibration at the fingertip through the movable plate 3 in contact with the support substrate 4, and recognizes that a pressing operation is conducted.

The touch panel input device 30 according to the present embodiment uses a conventional touch panel input device without changing its constitution, and simply fixes a piezoelectric substrate 2 to the touch panel input device for adding a vibration feature.

The adhesive layer 5 for adhering the individual frames 3A and 4A of the movable plate 3 and the support substrate 4 to each other may be an adhesive layer for fixing these faces opposing to each other.

Because both the movable plate 3 and the support substrate 4 are formed with a transparent material in the present embodiment, the touch panel input device 30 is placed on a display device such as a liquid crystal panel and a CRT, an operator presses the input operation surface 3a while seeing a displayed content, a pressed position is detected, and instruction input data corresponding to the displayed content are provided for a processing device such as a personal computer.

The display device is placed on the rear surface of the support substrate 4. A light-emitting element for illumination such as a light-emitting diode is also placed on the rear surface of the support substrate 4 in this application form. The display device, the light-emitting element or the wiring for them may generate high frequency noise. The support substrate 4 which serves as an insulating substrate acts as dielectrics. In this case, the noise is superimposed on the leader electrode 9a and 9b formed on the support substrate 4, and the superimposed noise could cause errors in detecting a pressed position.

Because the drive electrodes 2a and 2b adhered to the piezoelectric substrate 2 are interposed between the display device, the light-emitting element, or the wiring for them on the rear side of the support electrode 4, and the leader electrodes 9a and 9b in the present embodiment, the electrodes 2a and 2b serve as a shield to the leader electrodes 9a and 9b, for cutting off high frequency noise. Thus, errors in detecting the pressed position are prevented.

While the drive voltage is impressed on the piezoelectric substrate 2 when the pressure on the movable plate 3 is detected for the first time in the first and second embodiments, the drive voltage may be impressed on the piezoelectric substrate 2 to vibrate the movable plate 3 or the support substrate 4 when the pont on the display that is pressed corresponds to the location of a specific icon displayed on the display device based on the detected pressed position data in addition to the detected pressure. The drive voltage waveform may be changed to correspond to different individual icons, so that the vibration action which an operator feels changes to indicate the type of action selected. This is useful of sighted persons, but is vital for a blind operator who can feel the type of icon contacted by the fingertip.

Though the embodiments are described with reference to resistance-sensitive tablet type analog touch panel input devices 1 and 30, the touch panel input devices 1 and 30 may be so-called digital type touch panel input devices in which the movable conductor layer 6 and the fixed conductor layer 7 are respectively divided into a large number of parallel strips of movable contact pieces and fixed contact pieces. The strips are attached to opposing surfaces of the movable plate 3 and support substrate 4 such that they are orthogonal to each other. This forms a matrix of contact positions. The digital type touch panel input device detects a pressed position on the movable plate 3 based on a contact position of the movable contact piece and the fixed contact piece which are in contact with each other.

The piezoelectric substrate may be fixed to the front surface or the rear surface of the movable plate 3 as long as it has a certain degree of stiffness. The movable plate or the support substrate to which the piezoelectric substrate is fixed may be made of any material such as glass, plastic, or metal as long as it has sufficient stiffness to generate vibration when the piezoelectric substrate contracts and expands.

A low drive voltage can efficiently vibrate the movable plate or the support substrate when the pair of drive electrodes are affixed to the front and rear surfaces opposing to each other in the thickness direction of the piezoelectric substrate, and the piezoelectric substrate is fixed to the movable plate or the support substrate through one of the drive electrode. An electric field is present in the thickness direction of the piezoelectric substrate as shown in the embodiments. However, the method of fixing the drive electrodes is not limited to the described embodiments, and the drive electrodes may be fixed to side surfaces of the piezoelectric substrate orthogonal to the movable plate or the support substrate. The piezoelectric substrate may be directly fixed to the movable plate or to the support substrate.

When the piezoelectric substrate is attached to the movable plate 3 or the support substrate 4 as in the present invention, different types of applications are derived in addition to directly generating vibration.

For example, with the piezoelectric substrate fixed to the movable plate, a pressing operation generates a pressure from the movable plate. A voltage generated by distortion of the piezoelectric substrate bent by the pressure is detected to detect a pressure on the touch panel input device. This voltage may be used in applications for using the piezoelectric effect of the piezoelectric substrate (using a voltage signal generated from mechanical distortion). If this output voltage is integrated in an integration circuit, the force exerted on the movable plate can be determined.

When acceleration is applied on the piezoelectric substrate, the piezoelectric effect provides a voltage as well. Thus, the piezoelectric substrate can be applied to an energy saving circuit. This circuit may be the only one necessary to monitor an output from the piezoelectric substrate in a standby state. That is, the monitor is completely quiescent in the standby state, and is self-powered by the piezoelectric voltage. When an operator takes out a device bearing the touch panel input device, the circuit detects the voltage caused by an acceleration applied on the piezoelectric substrate. This voltage enables turning on the other main circuits.

If the piezoelectric substrate is exposed on the surface of the movable plate, the piezoelectric substrate may be vibrated by sound pressure from the speech of an operator. Thus, the piezoelectric substrate can be used as a simple microphone.

Further, when the piezoelectric substrates are fixed on two edges opposing to each other on the input operation surface, because bends transmitted to the individual piezoelectric substrates depend on distances from a pressed position to the fixed positions of the piezoelectric substrates when a pressure is applied, it is possible to detect the pressed position by comparing the outputs from the pair of piezoelectric substrates.

As described above, because the movable plate 3 and the support substrate 4, which constitute the touch panel input devices 1 and 30, vibrate by themselves according to the first aspect of the invention, it is not necessary to provide a vibration source in a space independent to these devices. Thus, the thickness and the size of the entire input devices is not increased.

Because the movable plate 3 and the support substrate 4 vibrate by themselves, it is not necessary to provide a support mechanism and a transmission mechanism for a vibration generating source. Because noise is not generated or vibration energy is not damped by transmission, a small amount of drive voltage efficiently generates vibration. Thus, simply generating momentary vibration without maintaining the vibration for a certain period makes the vibration sensitive to an operator. A simple circuit without an oscillation circuit can drive the piezoelectric substrate.

Because the movable plate 3 and the support substrate 4 vibrate simply following the contraction and expansion of the piezoelectric substrate 2, it is possible to transmit the vibration without delay after pressure is detected, and to change the drive waveform for providing a slight change in vibration feeling for an operator.

Because the piezoelectric substrate 2 can have a single layer structure, and the thickness can be thinner, it is manufactured at a low cost. Because a low drive voltage provides a large bend, a large-amplitude vibration is efficiently generated on the movable plate 3 and on the support substrate 4.

Because the piezoelectric substrate to which the pair of drive electrodes are fixed is installed in an installation space required for the spacer member for slightly separating the movable plate and the support substrate, additional independent space for a structure for applying the vibration action according to the second aspect of the invention is not required.

A leader electrode electrically connected to the peripheral edge of the conductor layer serves as one drive electrode of the piezoelectric substrate. It is not necessary to form that drive electrode independently according to the third aspect of the invention. Also, the lead for connecting the leader electrode with the external circuits is also shared. It is thus not necessary to provide independent wiring for supplying drive voltage to that drive electrode.

Because the piezoelectric substrate is simply fixed on the rear surface of the support substrate through a drive electrode according to the fourth aspect of the invention, a conventional touch panel input device may be modified by simply adding the vibration feature.

Because the drive electrodes shield the high frequency noise received from the rear surface of the support substrate according to the fifth aspect of the invention, errors in detecting a pressed position caused by the high frequency noise superimposed on the leader electrodes is prevented.

Because an oscillation circuit for generating a continuous vibration, and the like are not necessary according to the sixth aspect of the invention, a simple drive circuit for the piezoelectric substrate generates vibration sensitive to an operator.

Input operation feeling is provided for an operator using an operation sound without providing an independent sound source such as a speaker according to the seventh aspect of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A touch panel input device comprising:
a movable plate;
an input operation surface on a surface of said movable plate;
a support substrate facing said movable plate across an insulating gap;
a first conductor layer on a first surface of said movable plate facing said support substrate;
a second conductor layer on a second surface of said support substrate facing said movable plate;
pressure detecting means for detecting a pressure and a pressed position on said input operation surface based on a contact between said first and second conductor layers;
the pressure detecting means further including a voltage detection circuit operable to read a constant electric gradient formed across the movable plate, wherein the electric gradient at the pressed position is at a value proportional to a distance from a side of the moveable plate;
means for providing pressed position data indicating a position of said pressure;
a piezoelectric substrate mechanically fixed to one of said movable plate and said support substrate; and
means for applying a drive voltage to said piezoelectric substrate responsive to said pressure, whereby contracting and expanding of said piezoelectric substrate in response to said drive voltage vibrates the one of said movable plate and said support substrate to generate an input operation feeling.

2. A touch panel input device according to claim 1, wherein said piezoelectric substrate includes a pair of drive electrodes fixed on opposed surfaces thereof.

3. A touch panel input device according to claim 2, wherein said means for detecting pressure is connected through at least one of said drive electrodes.

4. The touch panel input device according to claim 1 further comprising:
a spacer member placed at peripheral frames between inner surfaces of said movable plate and said support substrate for laminating and spacing said movable plate and said support substrate facing each other over a slight gap;
a drive electrode for applying said drive voltage to said piezoelectric substrate; said piezoelectric substrate is fixed directly or through said drive electrode on an inner surface of one of said movable plate and said support substrate; and
said piezoelectric substrate is installed in a space where said spacer member is placed.

5. The touch panel input device according to claim 4, wherein:
said pressure detecting means impresses a detecting voltage on, or detects a voltage of any leader electrode electrically connected with a peripheral edge of the individual conductor layers of said movable plate or said support substrate to detect said pressure and said pressed position on said input operation surface;
said leader electrode fixed on said inner surface of said frame of said movable plate or said support substrate serves as one of said drive electrodes of said piezoelectric substrate; and
said piezoelectric substrate is fixed through said leader electrode.

6. The touch panel input device according to claim 1, wherein said piezoelectric substrate is fixed directly on a rear surface of said support substrate.

7. The touch panel input device according to claim 1, wherein said piezoelectric substrate is fixed through a drive electrode on a rear surface of said support substrate.

8. The touch panel input device according to claim 6, wherein:
said movable plate and said support substrate are made of a transparent material for transmitting emitted light from a light-emitting element for illumination provided on a rear side of said support substrate; and
said piezoelectric substrate is fixed directly or through said drive electrode to a part of a rear surface of said support substrate where leader electrodes electrically connected with a peripheral edge of said conductor layer are formed.

9. The touch panel input device according to claim 1, further comprising:
a coil; means for impressing a low voltage trigger pulse to said coil when said pressure is detected;
said coil being effective for producing said drive voltage in response to said trigger pulse.

10. The touch panel input device according to claim 1, further comprising means for modulating said drive voltage at audio frequencies whereby a sound representing an input operation is generated.

11. A touch panel input device comprising:
a movable plate;
an input operation surface on a first surface of said movable plate;
a support substrate disposed opposite to said movable plate across an insulating gap;
a first conductor layer on a second surface of said movable plate facing said support substrate;
a second conductor layer on a first surface of said support substrate facing said movable plate, the first and second conductor layers being separated by said insulating gap;
an adhesive layer disposed between said movable plate and said support substrate;
a piezoelectric substrate disposed within said insulating gap, said piezoelectric substrate having a pair of first and second driving electrodes which span a height of the piezoelectric substrate;
pressure detecting means for detecting a pressure and a pressed position on said input operation surface based on a contact between said first and second conductor layers;
the pressure detecting means further including a voltage detection circuit operable to read a constant electric gradient formed across the movable plate, wherein the electric gradient at the pressed position is at a value proportional to a distance from a side of the moveable plate;
means for providing pressed position data indicating a position of said pressure; and
means for applying a drive voltage to said piezoelectric substrate responsive to said pressure, whereby contracting and expanding of said piezoelectric substrate in response to said drive voltage vibrates the one of said movable plate and said support substrate to generate an input operation feeling.

12. The touch panel input device according to claim 11, wherein the second driving electrode of the piezoelectric substrate is folded such that the first and second driving electrodes are located on the same plane.

13. The touch panel input device according to claim 11, further comprising:
a conductive adhesive,
wherein the piezoelectric substrate is fixed to the first surface of the support substrate and the second conductor layer using the conductive adhesive.

14. A touch panel input device comprising:
a movable plate;
an input operation surface on a first surface of said movable plate;
a support substrate disposed opposite to said movable plate across an insulating gap;
a first conductor layer on a second surface of said movable plate facing said support substrate;
a second conductor layer on a first surface of said support substrate facing said movable plate, the first and second conductor layers being separated by said insulating gap;
a first adhesive layer disposed between said movable plate and said support substrate;
a second adhesive layer disposed on a second surface of said support substrate;
a piezoelectric substrate affixed to the second surface of said support substrate via said second adhesive layer, said piezoelectric substrate having a pair of first and second driving electrodes which span a height of the piezoelectric substrate;
pressure detecting means for detecting a pressure and a pressed position on said input operation surface based on a contact between said first and second conductor layers;
the pressure detecting means further including a voltage detection circuit operable to read a constant electric gradient formed across the movable plate, wherein the electric gradient at the pressed position is at a value proportional to a distance from a side of the moveable plate;
means for providing pressed position data indicating a position of said pressure; and
means for applying a drive voltage to said piezoelectric substrate responsive to said pressure, whereby contracting and expanding of said piezoelectric substrate in response to said drive voltage vibrates the one of said movable plate and said support substrate to generate an input operation feeling.

15. The touch panel input device according to claim 14, further comprising: a light emitting element disposed on the second surface of the support substrate.

* * * * *